United States Patent [19]

Tomisawa et al.

[11] 3,812,478

[45] May 21, 1974

[54] SEMICONDUCTOR STORAGE DEVICE

[75] Inventors: Norio Tomisawa; Takehisa Amano; Yasuji Uchiyama; Takatoshi Okumura, all of Hamamatsu, Japan

[73] Assignee: Nippon Gakki Seizo Kabushiki Kaisha, Hamamatsu-shi, Shizuoka-ken, Japan

[22] Filed: July 27, 1972

[21] Appl. No.: 275,899

[30] Foreign Application Priority Data

| | | |
|---|---|---|
| July 31, 1971 | Japan | 46-57838 |
| July 31, 1971 | Japan | 46-57829 |
| Sept. 1, 1971 | Japan | 46-67293 |
| Nov. 22, 1971 | Japan | 46-93974 |
| Nov. 22, 1971 | Japan | 46-93975 |
| Nov. 22, 1971 | Japan | 46-93976 |

[52] U.S. Cl. ........ 340/173 R, 340/173 SP, 307/238

[51] Int. Cl. ........ G11c 11/40

[58] Field of Search ........ 340/173 R, 173 SP; 307/238

[56] References Cited

UNITED STATES PATENTS

| | | | |
|---|---|---|---|
| 3,735,367 | 5/1973 | Bennett | 340/173 SP |
| 3,504,132 | 3/1970 | Wallace | 340/173 SP |
| 3,721,964 | 3/1973 | Barrett | 340/173 SP |

*Primary Examiner*—Terrell W. Fears
*Attorney, Agent, or Firm*—Holman & Stern

[57] ABSTRACT

Sampled analog values of a wave or a function are stored in a semiconductor storage device constituted in the form of an integrated circuit. The device comprises a plurality of storage regions each having a dimension determining an impedance value corresponding to each of the sampled values, a plurality of transistor regions connected to the respective storage regions, read-out terminals connected to the transistor regions, and an output terminal connected to the storage regions. When pulses are applied to the read-out terminals one by one successively, a wave or a function of the stored shape is produced from the output terminal. Any shape of the signal can be easily obtained. The device is very suitable for accurate mass-production.

5 Claims, 25 Drawing Figures

SEMICONDUCTOR STORAGE DEVICE

BACKGROUND OF THE INVENTION

The present invention relates to semiconductor storage devices storing analog quantities sampled from a waveform or a function.

In conventional storage devices which serve to store analog quantities, individual storage elements such as resistors whose values are determined in accordance with the analog quantities to be stored therein are provided and the analog quantities stored therein are read out by successively providing electrical connection to the elements with the aid of mechanical contacts.

However, in such a conventional storage device storage elements must be provided for each analog quantities: that is, one element is necessary for one analog quantity. Therefore, it is necessary to provide a plurality of storage elements in the conventional storage device, as a result of which the conventional storage device is inevitably large in size. In addition, since the number of the elements must be increased in order to improve the sampling accuracy of analog information, the dimensions of the storage device dictate that there is a limit to improving the sampling accuracy of analog log information. Therefore, the sampling accuracy of the conventional storage device is rather low.

These elements storing an analog quantity are dispersed in value, even if they are manufactured with care. Consequently, the high precision storage elements are considerably costly. Furthermore, the values of such elements available in market are standardized, and therefore storage elements having values other than the standardized values must be specially ordered. This also will cause the price of the element to be higher.

In addition, the conventional analog storage device carries out its information read-out with the aid of mechanical contacts. Accordingly, the service life of the mechanical contacts becomes one of the important operational factors of the conventional analog storage device. Furthermore, the conventional analog storage device suffers from the fact that its read-out speed is relatively slow.

Various storage elements have been used such as magnetic storage elements or semiconductor type storage elements which are used for storing digital information; however, it is necessary to provide a digital-analog converter (D-A) in order to obtain the analog information from the reading of these elements. Furthermore, if the number of bits of the digital-analog converter are limited to a certain value, the accuracy of the analog output information is poor.

A function generator which successively generates predetermined voltage upon receiving clock inputs has been utilized as a storage read device of analog information. The function generators now being used can be classified briefly into two types, namely, electron tube type and servo-motor type. However, these function generator are costly, and the electron tube type function generators especially are low in both accuracy and stability, and the servo-motor type function generators are low in reliability and upper speed limit because they employ mechanical parts.

In addition, there is, for instance, a musical tone generating device which necessitates an intricate analog waveform. In the musical tone generating device, in order to create a musical tone waveform, the outputs from many oscillators oscillating different frequencies are combined, and a waveform containing harmonic tone components is passed through intricate filters. However, the device according to such conventional methods as described above necessitates a number of oscillators and filters, as a result of which the device becomes constructionally complicated and low in stability. Furthermore, in the conventional device it is impossible to obtain an intricate waveform containing the 30th harmonic tone or higher which is included in the tones of a natural musical instrument such as a piano and the like.

A conventional digital-analog converter comprises a number of switches and resistance networks. In the conventional digital-analog converter, predetermined switches are closed in response to digital signals thereby obtaining necessary analog signals from the resistance networks.

However, in such a conventional digital-analog converter, a number of resistance elements are arranged in a resistance network and many switches are used. As a result, the conventional digital-analog converter is large in size. Furthermore, since resistance elements used are apt to be dispersed in value in the process of manufacturing them, the converter would be costly if resistance elements of high precision were used therein. In addition, since there is a limit in the operating speed of each switch, there is also a limit in the conversion at a high rate.

SUMMARY OF THE INVENTION

It is accordingly a first object of the present invention to provide a device which stores analog information into storage regions provided in a semiconductor body and a device which reads the analog information thus stored.

A second object of the present invention is to provide a semiconductor storage device which is formed as an integrated circuit by determining the dimensions of separate storage regions in accordance with the separate analog values to be stored therein.

A third object of the present invention is to provide a semiconductor storage device small in size in which a number of storage regions are embedded in the form of an integrated circuit.

A fourth object of the present invention is to provide a semiconductor storage device which has long service life, high in sampling accuracy and high in relative accuracy, because it has no consumable part.

A fifth object of the present invention is to provide a semiconductor storage device which is high in yield, low in cost and high in reliability, because the active elements thereof are relatively a few in number.

A sixth object of the present invention is to provide an analog information storage and read device which is simple in construction and high in various operating characteristics such as read speed, accuracy and stability with no mechanical part.

A seventh object of the present invention is to provide an analog information storage and read device which is utilized for a musical tone generating device, a function generator and the like, the musical tone generating device storing and reproducing intricate tone such as is produced from a natural musical instrument, the function generator carrying out the random read-out of information.

An eighth object of the present invention is to provide an analog-digital converter in which the connecting portions of a diffusion resistance layer formed in a semiconductor body is improved in dimensional accuracy whereby analog voltage values are improved in accuracy and the relative errors of resistances between the connecting portions are reduced.

A ninth object of the present invention is to provide an analog-digital converter which is small in size by fOrming transistors, resistances, and connecting wires in as a semiconductor integrated cicuit.

A tenth object of the present invention is to provide a semiconductor storage device simple in design in which the processes of manufacturing the elements of different storage contents are the same for every element up to a contact-cut process and the storage contents are determined by a pattern of metal vacuum-evaporation only.

An 11th object of the present invention is to provide a semiconductor storage device which comprises a ladder type attenuation circuit which is formed with a common diffusion resistance layer simple in shape, and predetermined output voltages are obtained by effectively utilizing the area of the diffusion resistance layer.

The foregoing objects and other objects as well as the characteristic features of the present invention will become more apparent from the following detailed description and the appended claims when read in conjunction with the accompanying drawings.

BRIEF DESCRIPTION OF THE DRAWINGS

In the accompanying drawings:

FIG. 2 (*b*) is a diagram showing an output voltage waveform;

DETAILED DESCRIPTION OF THE INVENTION

Figure 1:
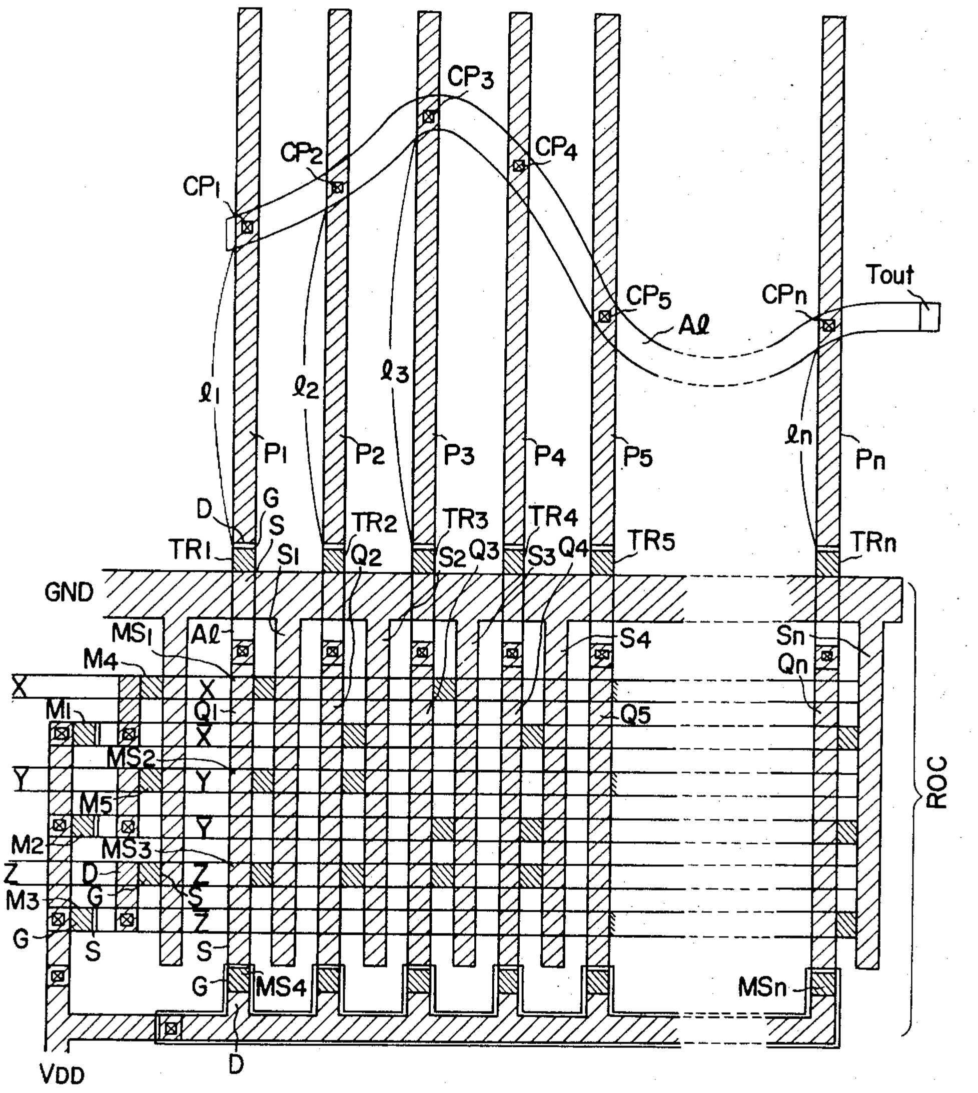
FIG. 1 is a plan view showing one embodiment of the semiconductor storage device according to the present invention.

With reference now to FIG. 1, there is shown a plan view illustrating the construction of a semiconductor integrated circuit.

For convenience in describing the present invention, in each of the accompanying drawings, semiconductor integrated circuits are of MOS type and transistors are of P channel type. In addition to the above, a P type diffusion layer, and the gate electrode of an MOS type transistor are indicated by ▨ and ▧, respectively. Moreover, a vacuum-evaporated metal portion and a portion connecting the vacuum-evaporated metal portion and the P type diffusion layer are indicated by ☐ and ⊠, respectively.

As is shown in FIG. 1, P type diffusion resistance layers $P_1$, $P_2$ through $P_n$ embedded in a semiconductor substrate are formed in the state of plural belts, and each of the layers $P_1$, $P_2$, through $P_n$ is connected to a vacuum-evaporated aluminum layer A*l*, but its length from the connected point of the aluminum layer corresponds to an analog quantity to be stored therein. In other words, the lengths $l_1$, $l_2$ through $l_n$ of the respective P type diffusion layers $P_1$, $P_2$ through $P_n$ correspond to sampled analog values to be stored, respectively. Therefore, the P type diffusion layers $P_1$, $P_2$ through $P_n$ have resistances corresponding to their lengths, respectively.

The lower end portions of the P type diffusion layers $P_1$, $P_2$ through $P_n$ from the drains of MOS type (P channel) transistors $TR_1$ through $TR_n$, respectively. These transistors $TR_1$ through $TR_n$ are made to be conductive by read-out signal voltages (negative) which are applied to the gate electrodes G (as the read-out terminals) from a read-out control circuit ROC. Therefore, when pulses having values sufficiently negative to make the transistors $TR_1$ through $TR_n$ conductive are applied successively to the gate electrodes thereof from the read-out control circuit ROC, the transistors $TR_1$ through $TR_n$ will be made conductive successively. The opposite sides (not shown in FIG. 1) of the P type diffusion layers $P_1$, $P_2$ through $P_n$ which are connected in common with the aluminum layer are connected through a proper load resistance to a negative electric source, and output voltages corresponding to the lengths $l_1$ through $l_n$ of the P type diffusion layers $P_1$ through $P_n$ are therefore successively obtained at an output terminal T-out of the vacuum-evaporated aluminum layer A*l*.

In this connection, the read-out control circuit ROC will be described in detail. In FIG. 1, the P type diffusion layer is used as the source and drain of the MOS type transistor and as a connecting lead. Transistors $M_1$ through $M_6$ are used to create readout control signals X, $\bar{X}$, Y, $\bar{Y}$, Z and $\bar{Z}$ from input signals X, Y and Z, whereas transistors $MS_1$ through $MS_n$ serve to create read-out signals which are to be applied to the gate electrodes of the transistors $TR_1$ through $TR_n$ in response to the read-out control signals described above. The gates of these transistors are formed by vacuum-evaporating aluminum on the thin oxide films between the drains $Q_1$, $Q_2$ through $Q_n$ and the sources $S_1$ through $S_n$ of the P type diffusion layers, respectively, in a well-known manner.

The transistors $MS_1$ through $MS_n$ are provided at such positions as the read-out control signals $\bar{X}$, X, $\bar{Y}$, Y, Z and $\bar{Z}$ are selected so that the transistors can apply the readout signals to the gate in a predetermined order.

A specific example of the present invention is shown in FIG. 1, but it is clear that the positions and number of the transistors can be selected optionally.

One example of the P type diffusion layer serving to store analog sampling values has proved the following fact. That is, if the diffusion layer is 10 $\mu m$ wide, 2 $\mu m$ deep and 1 mm long, with $ps = 200\ \Omega/\square$ the resistance of the diffusion layer is about 20kΩ which is convenient in practical use. Moreover, if the diffusion layers are spaced about 20 to 30 $\mu$m and the number of them ($P_1$ through $P_n$) is 64, the size of the whole storage section is considerably miniaturized to about 1 mm × 1.5 mm.

Figure 2A:
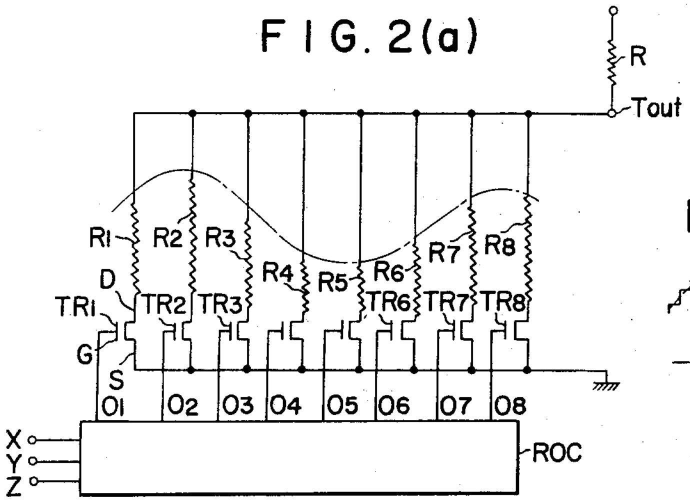
FIG. 2 (*a*) is an equivalent circuit diagram of the device shown in FIG. 1.
Figure 2B:
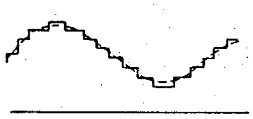

FIG. 2(*a*) shows an equivalent circuit of the semiconductor storage device of FIG. 1. The lengths graphically shown of resistors $R_1$, $R_2$ through $R_n$ represent the resistance values corresponding to the lengths $l_1$ through $l_n$ of the respective P type diffusion layers $P_1$, $P_2$ through $P_n$. It will therefore be apparent from FIG. 2(*a*) that analog output voltages such as shown in FIG. 2(*b*) are read out.

It goes without saying that the read-out control circuit ROC could be made in various ways. One example of the read-out control circuit which is in the form of an integrated circuit is shown in FIG. 1.

In FIG. 2(*a*), one-ends of the resistors $R_1$ through $R_8$ are connected to an electrical source through a load resistance R, whereas the other-ends of the resistors are connected to the drains D of field-effect transistors $TR_1$ through $TR_8$, respectively. The sources S of the transistors $TR_1$ through $TR_8$ are connected together to the ground, while the gates G thereof are connected to the output terminals $O_1$ through $O_8$ of the read-out control circuit ROC.

Any well-known read-out control circuit may be used in the device of FIG. 2(*a*) if it is made to apply read-out signal pulses to the output terminals $O_1$ through $O_8$ in response to read-out instruction signals.

If the input signals X, Y and Z are applied to the read-out control circuit ROC, voltage pulses are applied successively to the output terminals $O_1$, $O_2$ through $O_8$ in this order, and the application of the voltage pulses is conducted cyclically. Therefore, when the voltage pulse produced at the terminal $O_1$ is applied to the gate of the transistor $TR_1$, an electrical current flows from the electrical source through the load resistance R, the resistor $R_1$ and the drain-source of the transistor $TR_1$ to the ground. Accordingly, a voltage corresponding to the resistance of the resistor $R_1$ is read out at the output terminal T-out. Similarly, when such voltages pulses as described above are applied to the terminals $O_2$ through $O_8$, voltages corresponding to the resistances of the resistors $R_2$ through $R_8$ are successively read out at the output terminal T-out. Thus, the output voltages obtained at the output terminal T-out are plotted as a waveform as shown in FIG. 2(*b*) with the abscissa of time. The voltage waveform shown in FIG. 2(*b*) clearly corresponds to the pattern of the resistances of the resistors $R_1$ through $R_8$.

In the device described above, analog values obtained by sampling the specific analog information at equal time intervals are stored in the resistors, respectively. However, it is possible to determine the sampling interval as desired by selecting the number of the transistors. Therefore, analog information which is high in sampling accuracy can be read therefrom.

Figure 3:
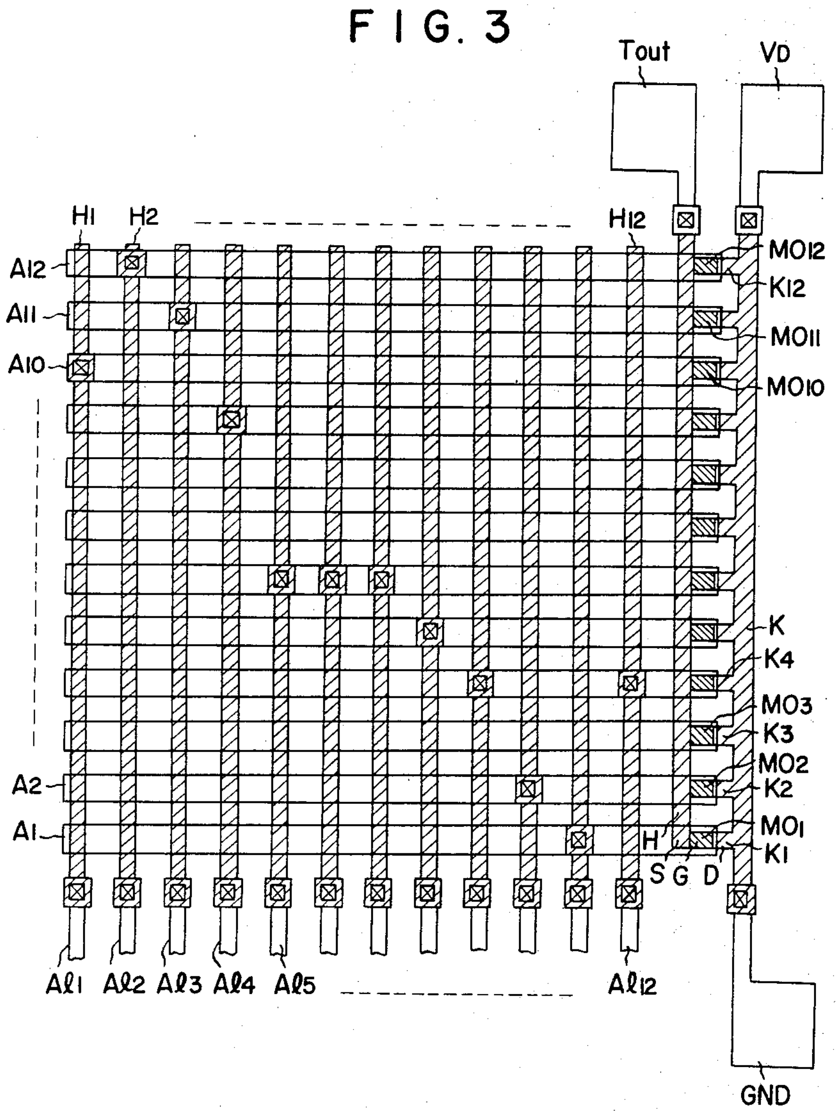
FIG. 3 is a plan view showing one modification of the device of FIG. 1.

Referring to FIG. 3, there is shown one modification of the semiconductor storage device according to the present invention in which a common P type diffusion resistance layer is provided, and output voltages corresponding to various lengths available in the resistance layer are obtained at proper positions on the layer in response to readout signals.

In FIG. 3, one end of a P type diffusion layer K is connected to an electrical source $V_D$ and the other end thereof is connected to ground. The diffusion layer K is provided with a plurality of connecting portions $K_1$ through $K_{12}$ which are in turn connected to the drains of transistors $MO_1$ through $MO_{12}$, respectively. These drains are connected through a P type diffusion layer H to an output terminal T-out. Furthermore, vacuum-evaporated aluminum layers $A_1$ through $A_{12}$ are arranged at right angles to be P type diffusion layers $H_1$ through $H_{12}$ in the form of a grid, interposing insulating layers between the former layers and the latter layers. The layers $A_1$ through $A_{12}$ are connected to the P type diffusion layers $H_1$ through $H_{12}$ at predetermined intersections among the intersections of these layers.

One-end of each of the P type diffusion layers $H_1$ through $H_{12}$ are respectively connected to other vacuum-evaporated aluminum layers $Al_1$ through $Al_{12}$ to which read-out signals are applied from a read-out control circuit. For instance, if a read-out signal voltage is applied to the layer $Al_1$, the voltage thus applied is introduced to the gate of the transistor $MO_{10}$ through both the P type diffusion layer $H_1$ and the aluminum vacuum-evaporation layer $A_{10}$. As a result, the source and drain of the transistor $MO_{10}$ become conductive, and the voltage developed at the connecting portion of the diffusion layer K is read out at the output terminal T-out.

Similarly, the other transistors also become conductive in response to the read-out signals in the same way as described above, and the voltages at the connecting portions connected to the drains of the transistors are introduced to the output terminal.

Figure 4:
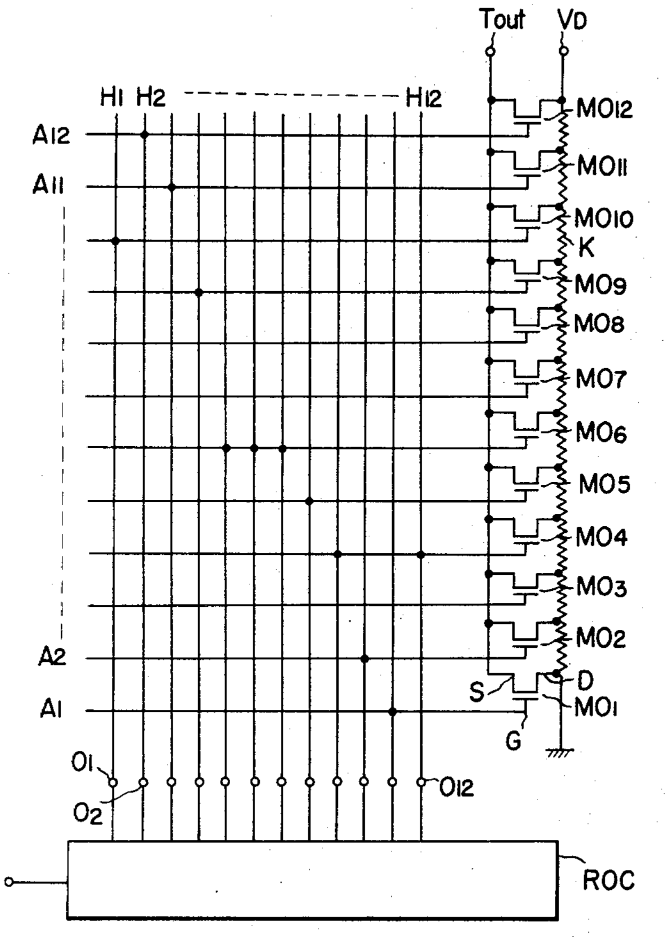
FIG. 4 is an equivalent circuit diagram of the device shown in FIG. 3.

FIG. 4 is an equivalent circuit diagram of the semiconductor storage device shown in FIG. 3. When the read-out signals are applied to the terminals $O_1$ through $O_{12}$ successively, in response to the application of the read-out signals the transistors $MO_{10}$, $MO_{12}$, $MO_{11}$, $MO_9$, $MO_6$, $MO_6$, $MO_5$, $MO_4$, $MO_2$, $MO_1$ and $MO_4$ become conductive in this order. As a result of which the analog quantities stored are read out successively as voltages which form an analog wave form.

As is apparent from the above description, if the diffusion layers $H_1$ through $H_{12}$ and the aluminum vacuum-evaporated layers $A_1$ through $A_{12}$ are made to be connected at the intersections corresponding to the analog quantities to be stored, the output voltages of predetermined magnitudes can be obtained in response to the read-out signals.

Figure 5A:
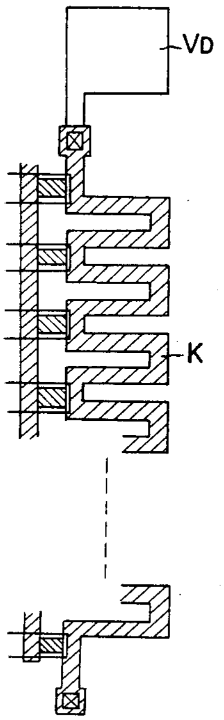
FIGS. 5 (*a*) and 5 (*b*) are plan views partially illustrating two modifications of the device of FIG. 3.
Figure 5B:
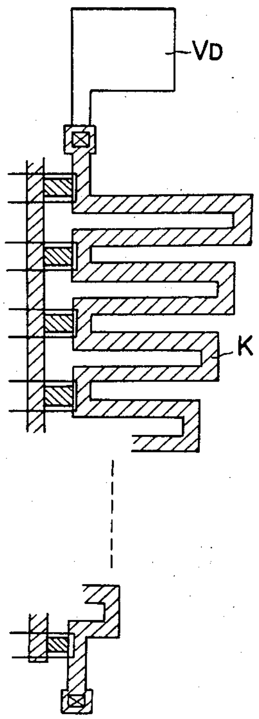

One modification of the device of FIG. 3 is shown in FIG. 5 (*a*) in which the P type diffusion layer is formed in the zigzag state. This lengthens the length of the P type diffusion layer thereby to increase the resistance of the layer. It goes without saying that the diffusion layer can be formed into any other suitable shape. In FIGS. 3 and 5(*a*), the resistances between the connecting portions of the diffusion resistance layer are made to be the same, but the resistances may be reduced gradually as shown in FIG. 5(*b*), or it may be preferable to logarithimically reduce the resistances.

Figure 6:
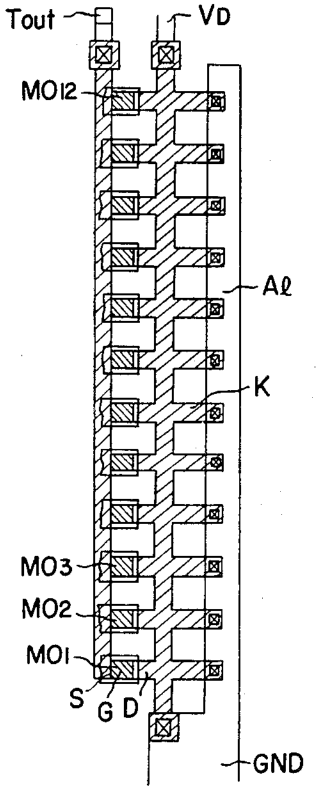
FIG. 6 is also a plan view partially showing another modification of the device of FIG. 3.
Figure 7:
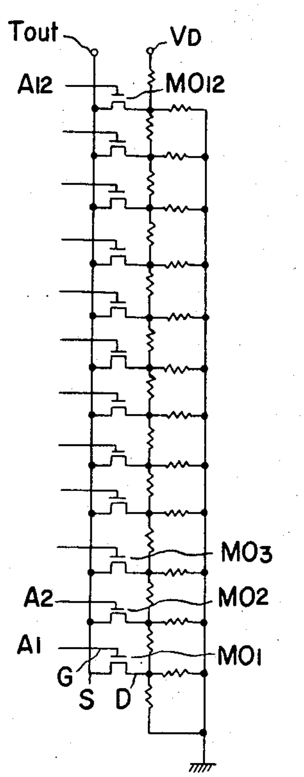
FIG. 7 is an equivalent circuit diagram of the modification shown in FIG. 6.

After modification of the device of FIG. 3 is shown in FIG. 6 in which the P type diffusion resistance layer K is formed as a ladder. FIG. 7 is an equivalent circuit diagram of the device shown in FIG. 6. Since the P type diffusion layer is thus formed as a ladder, voltages produced at the connecting portions have values which are arranged logarithmically. This arrangement is convenient for storing the analog waveform which increases or decreases longrithmically.

In the examples described above, the analog information is stored by the utilization of the resistance of the P type diffusion resistance layer.

Figure 10:
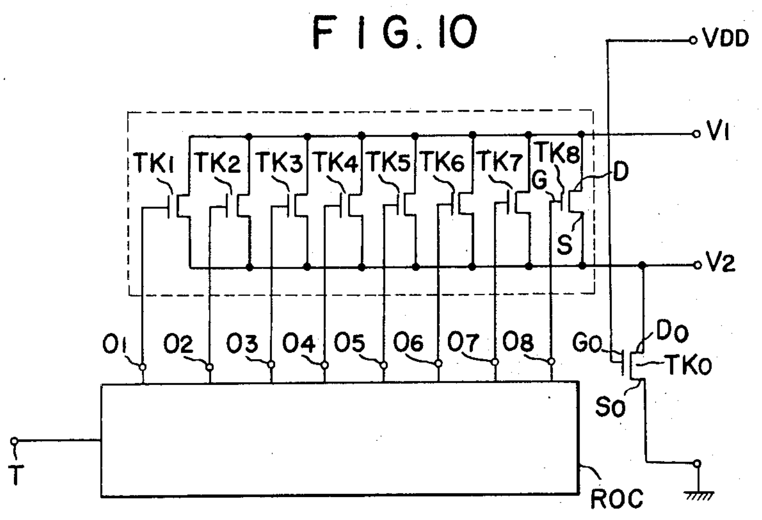
FIG. 10 is an equivalent circuit diagram of the devices shown in FIGS. 8 and 9.
Figure 8:
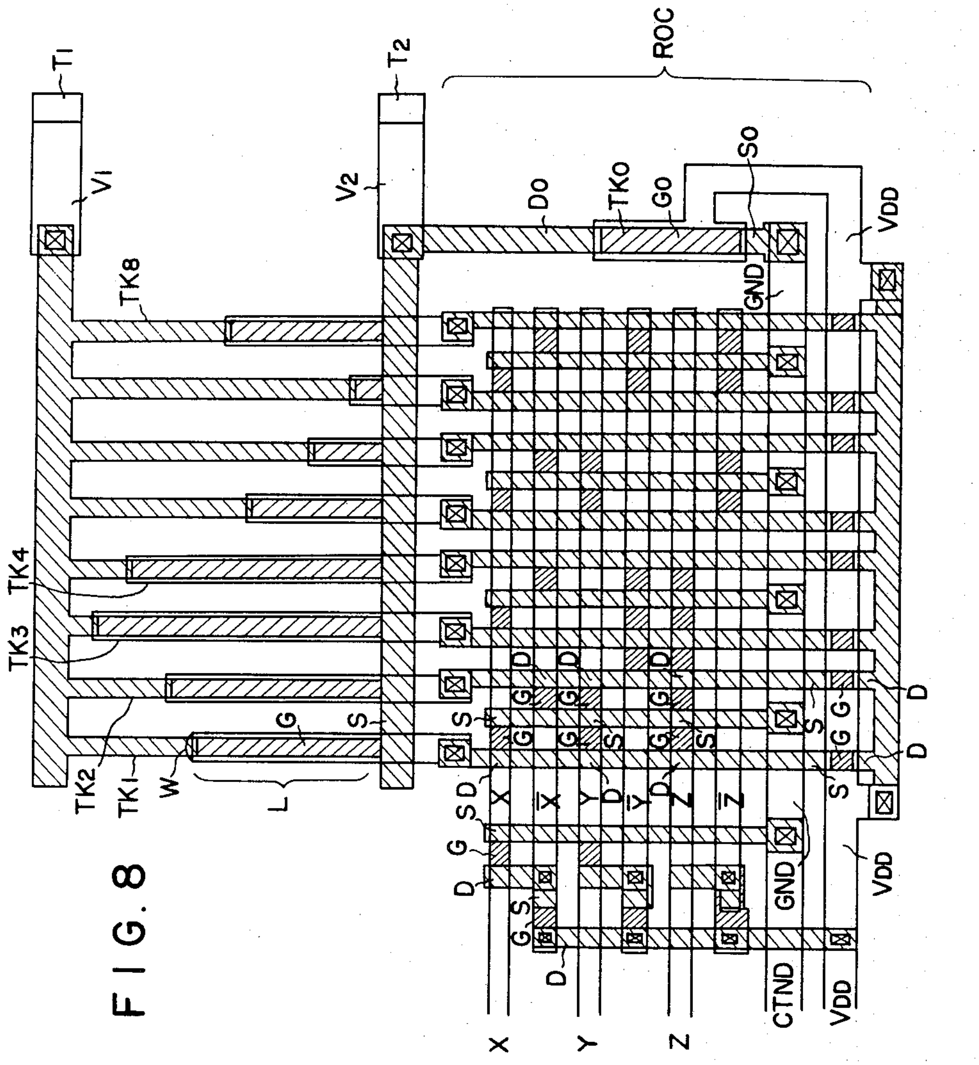
FIG. 8 shows another embodiment of the present invention.
Figure 9:
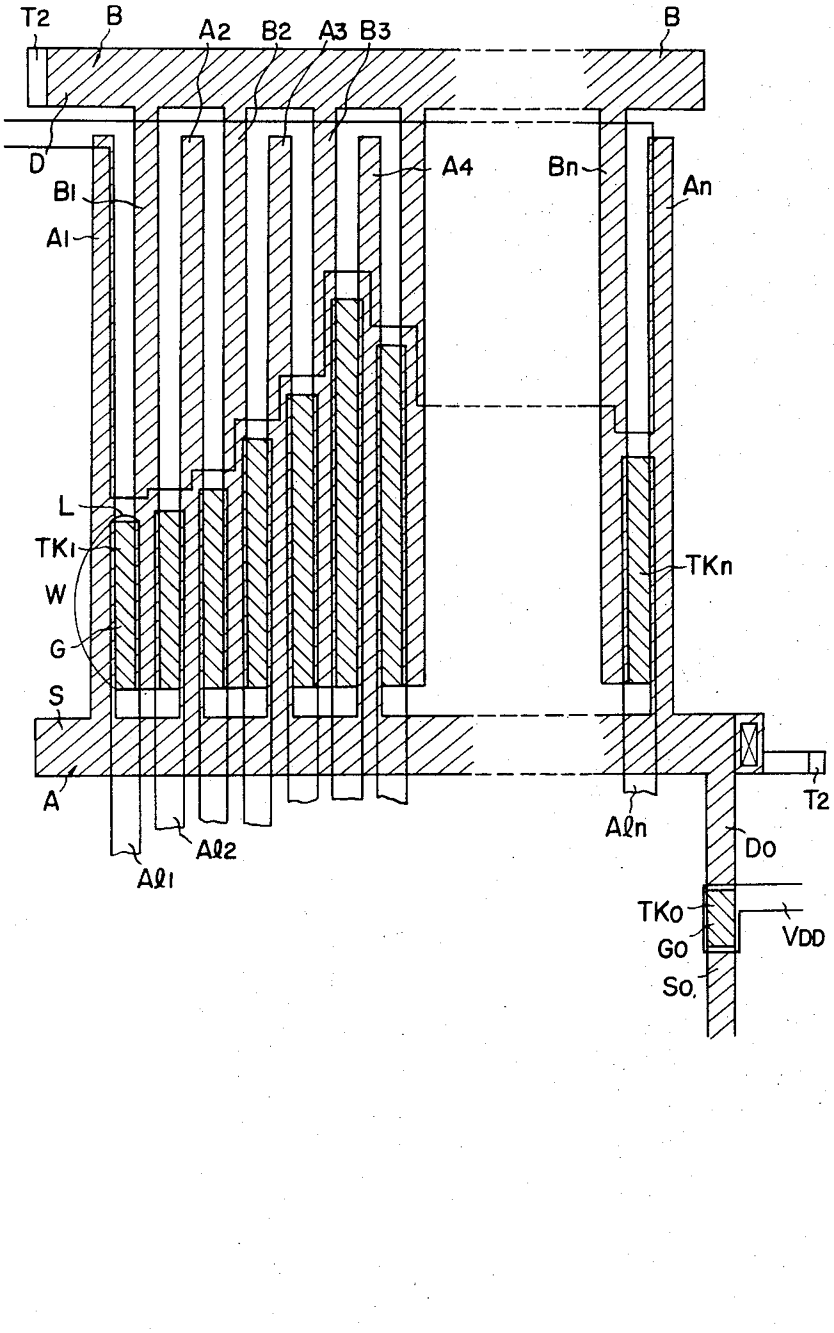
FIG. 9 is a plan view of one modification of the device shown in FIG. 8.

Another embodiment of the device of the present invention is illustrated in FIGS. 8 through 10 in which analog information is stored by the utilization of the difference in electrical characteristic of an MOS transistor.

The mutual conductance of an MOS transistor is usually represented by the following equation:

$$g_m = W/L\ K'\ (V_{GS} - V_{th}) \qquad (1)$$

where: L is the length of a gate channel, W is the width of the same, $V_{GS}$ is a voltage between the gate and the source, $V_{th}$ is a threshold voltage, and K' is a proportional constant which is represented by the following equation:

$$K' = \epsilon ox/T_{ox} \cdot \mu \qquad (2)$$

where: $\epsilon_{ox}$ is a dielectric constant, $T_{ox}$ is a thickness of oxide film, and $\mu$ is mobility of carriers.

As is obvious from the above two equations (1) and (2), the mutual conductance gm is proportional to the width of the channel but is inversely proportional to the channel length. Therefore, if a plurality of MOS transistors to be provided in the device are made to be the same in manufacturing specification except the gate channel length which is determined to be correspondent to an analog value to be stored, analog information can be stored. For the same reason, analog information can also be stored by varying the width W keeping the length the same.

As is previously described, FIG. 8 shows one example of the present invention in which the length of the gate channel of the MOS transistor is changed thereby to store analog information. The gate channels of the MOS transistors $TK_1$ through $TK_8$ are made the same in width, but the length thereof are made to be different in correspondence to analog quantities, as is shown in FIG. 8. The gates of the transistors $TK_1$ through $TK_8$ are applied with the readout signals from a read-out control circuit ROC, respectively. The read-out control circuit ROC is formed as shown in FIG. 8 in which the read-out signals are applied to the gates of the transistors $TK_1$ through $TK_8$ with the aid of the input signals X, Y and Z. A transistor $TK_o$ is a load transistor which is connected in common to the sources of the transistors $TK_1$ through $TK_8$. When a certain voltage is applied to a terminal $T_1$, an output voltage which is substantially inversely proportional to the length of the gate channel of the transistor which becomes conductive by a read-out signal, appears at a terminal $T_2$. Thus, the transistors $TK_1$ through $TK_8$ are successively made conductive in this order, and an analog voltage waveform corresponding to the pattern of the gate channel lengths is obtained at the common source side. The read-out control circuit is substantially the same as in FIG. 1, and the explanation in detail of it is therefore omitted.

Still another embodiment of the device of the present invention is shown in FIG. 9 in which the lengths of the gate channels of the transistors used to store analog values are made the same, but the widths thereof are changed corresponding to the analog values to be stored therein. In FIG. 9 P type diffusion layer A for a source is formed in the pattern of a comb, while a P type diffusion layer B for a drain also is formed in the pattern of a comb. The tooth-like portions $B_1$ through $B_n$ of the diffusion layer B are interposed between the tooth-like portions $A_1$ through $A_n$ of the diffusion layer A. The diffusion layer for a source and the diffusion layer for a drain extend their tooth-like portions to be adjacent and parallel to one another, and the distances between the tooth-like portions of the two layers are made the same. Therefore, MOS transistors are formed with the P type diffusion layer for a source, the P type diffusion layer for a drain and gate channels between these two layers. Since in each of the transistor thus formed a value of gm is, as is described before, correspondent to a value to be stored, when the transistor becomes conductive by a read-out signal, an output voltage corresponding to an analog value which has been stored is obtained at an output terminal $T_2$.

An equivalent circuit diagram of the devices shown in FIGS. 8 and 9 is illustrated in FIG. 10, and the operation of the equivalent circuit will be clearly understood from the descriptions provided above with reference to FIGS. 8 and 9.

Figure 11:
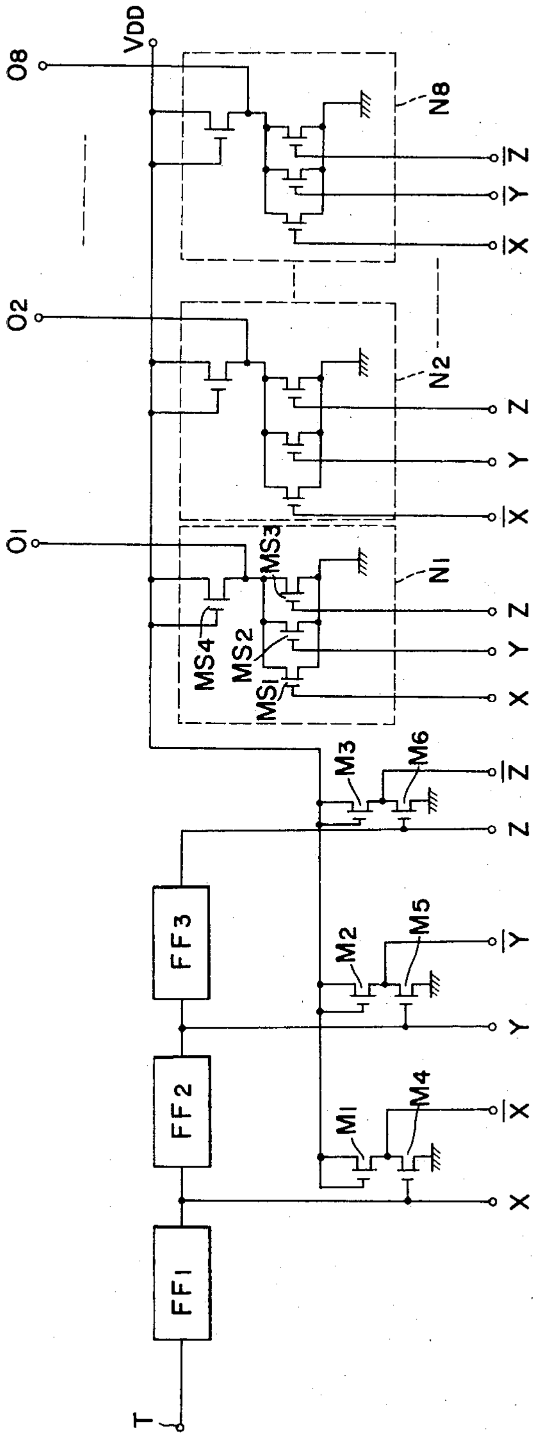
FIG. 11 shows a detailed circuit diagram of a read-out control circuit included in FIG. 10.
Figure 12:
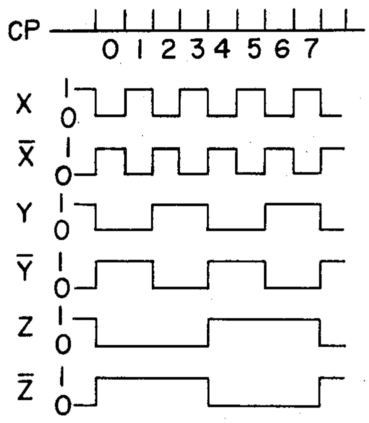
FIG. 12 is a graphic diagram showing waveforms appearing at various parts of the circuit shown in FIG. 11.

FIG. 11 shows in detail the read-out control circuit in FIG. 10. The read-out control circuit is composed so that read-out signals are introduced successively to output terminals $O_1$ through $O_8$ by the application of input clock pulses. That is, whenever the clock pulse is applied to an input terminal T, the condition of flip-flop $FF_1$ is inversed whereby a voltage of a waveform shown with "X" in FIG. 12 is obtained at the output of the flip-flop $FF_1$. Voltages having waveforms shown with "Y" and "Z" in FIG. 12 are obtained at the outputs of flip-flops $FF_2$ and $FF_3$, respectively, which are successively connected in series to the flip-flop $FF_1$. Pairs of MOS transistors $M_1$ and $M_4$, $M_2$ and $M_5$, and $M_3$ and $M_6$ are respectively connected in series between the power $V_{DD}$ and the ground. The gates of the respective MOS transistors $M_4$, $M_5$ and $M_6$ are respectively connected to the output sides of the flip-flops $FF_1$, $FF_2$ and $FF_3$, and another MOS transistors $M_1$, $M_2$ and $M_3$ are respectively connected as load resistors therefor. These transistors are adapted to obtain waveforms whose polarities are opposite to those of waveforms attained at the outputs of the respective flip-flops. MOS transistors $MS_1$ through $MS_4$ forming an NOR circuit $N_1$ produces a high level read-out signal "1" when all the input signals X, Y and Z are at a low level "O". The same NOR circuits as described above are connected to the other terminals $O_2$ through $O_8$. The relationships between input and output in the NOR circuit are shown in the following table:

| Output \ Input | $X\,Y\,Z$ | $\bar{X}\,Y\,Z$ | $X\,\bar{Y}\,Z$ | $\bar{X}\,\bar{Y}\,Z$ | $X\,Y\,\bar{Z}$ | $\bar{X}\,Y\,\bar{Z}$ | $X\,\bar{Y}\,\bar{Z}$ | $\bar{X}\,\bar{Y}\,\bar{Z}$ |
|---|---|---|---|---|---|---|---|---|
| $O_1$ | 1 | 0 | 0 | 0 | 0 | 0 | 0 | 0 |
| $O_2$ | 0 | 1 | 0 | 0 | 0 | 0 | 0 | 0 |
| $O_3$ | 0 | 0 | 1 | 0 | 0 | 0 | 0 | 0 |
| $O_4$ | 0 | 0 | 0 | 1 | 0 | 0 | 0 | 0 |
| $O_5$ | 0 | 0 | 0 | 0 | 1 | 0 | 0 | 0 |
| $O_6$ | 0 | 0 | 0 | 0 | 0 | 1 | 0 | 0 |
| $O_7$ | 0 | 0 | 0 | 0 | 0 | 0 | 1 | 0 |
| $O_8$ | 0 | 0 | 0 | 0 | 0 | 0 | 0 | 1 |

As is apparent from the above description, then the waveforms shown with "X", "Y", "$\bar{Z}$", "$\bar{X}$", "$\bar{Y}$" and "$\bar{Z}$" in FIG. 12 are applied to the read-out control circuit, read-out signals are delivered successively to the terminals $0_1$ through $0_8$ from the read-out control circuit ROC.

Figure 13:
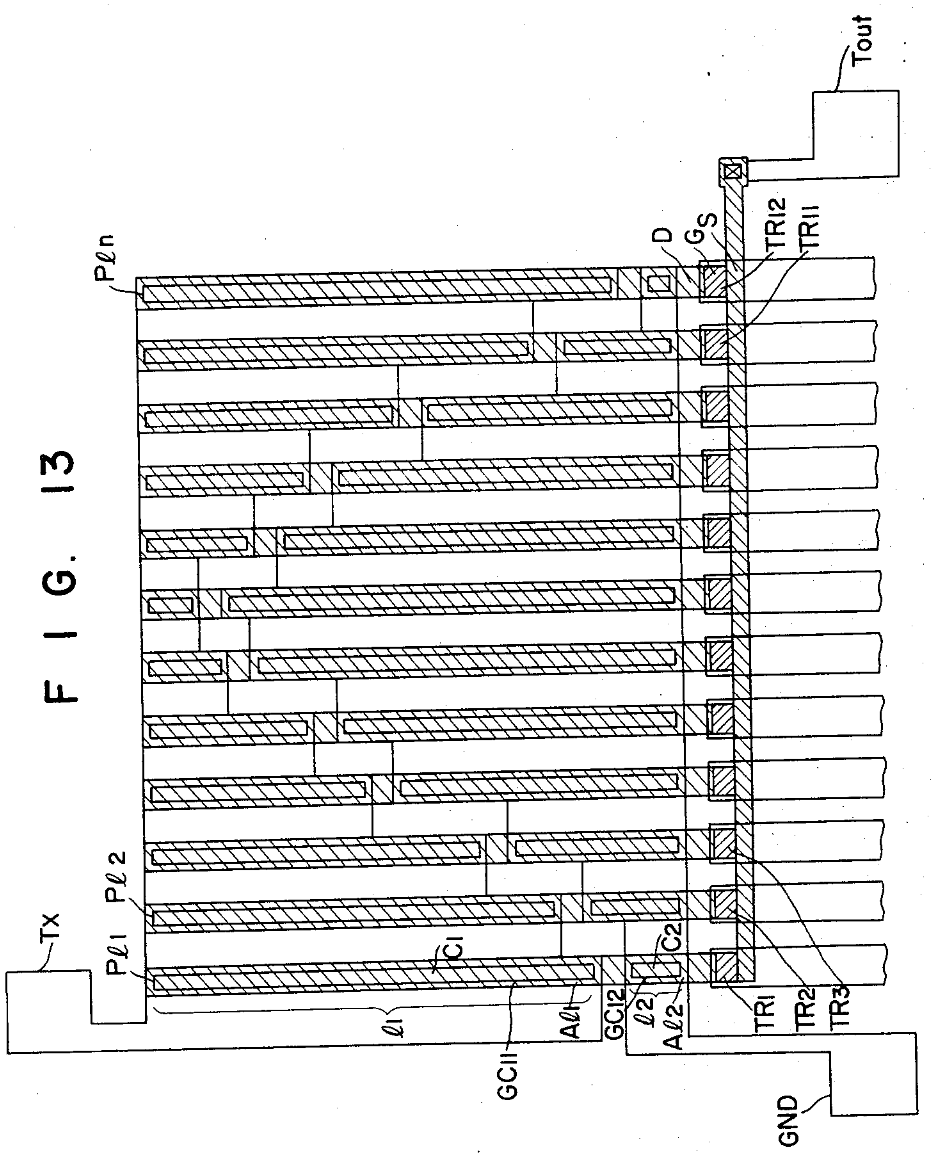
FIG. 13 is a plan view showing still another embodiment of the device according to the present invention.

A further embodiment of the present invention is shown in FIG. 13 in which the combination of a P type diffusion layer embedded in a semiconductor substrate, a thin oxide film having "cuts" (thinned portions for electrodes) and covering the layer and an aluminum electrode element constitutes a capacitor thereby to a store an analog value.

As is shown in FIG. 13, P type difusion layers $Pl_1$ through $Pl_n$ forming a plurality of belt-like portions are embedded in a semiconductor substrate constituting the lower electrode of the respective capacitors. An oxide film (not shown) is formed covering the diffusion layers. In the oxide film, "cuts" are provided at portions just above the respective diffusion layers, two for one belt layer. Furthermore, electrode metals $Al_1$ and $Al_2$ are laid on the thin oxide film confronting the respective belt layers, whereby the metals and the layers constitute capacitors at the respective "cut" portions $GC_{11}$ and $GC_{12}$.

If it is assumed that in the P type diffusion layer $Pl_1$ capacitance of a capacitor constituted at "cut" portion $GC_{11}$ of $l_1$ in length is $C_1$ and the capacitance of a capacitor constituted at the "cut" portion $GC_{12}$ of $l_2$ in length is $C_2$, a capacitance ratio $C_1/(C_1+C_2)$ represents the analog quantity to be stored thereat. Therefore, if a signal of high frequency, for instance, 100 $kH_z$ with a certain amplitude is applied across the metals $Al_1$ and $Al_2$, a signal of an amplitude obtained through voltage-division due to the capacitance ratio $C_1/(C_1+C_2)$ is obtained at the drain of the MOS transistor $TR_1$, and so forth. If a read-out signal is then applied to the gate of the MOS transistor $TR_1$, the transistor $TR_1$ becomes conductive. The high frequency signal of the amplitude which is resulted from the voltage-division is taken out from the source of the transistor $TR_1$. The output signal thus read from is rectified thereafter.

Similarly, in each of the other diffusion layers $Pl_2$ through $Pl_{12}$ a high frequency signal of an amplitude which is determined by a ratio of lengths set on the layer, i.e., a capacitance ratio, is obtained at the drain side of the concerned transistor.

Figure 14:
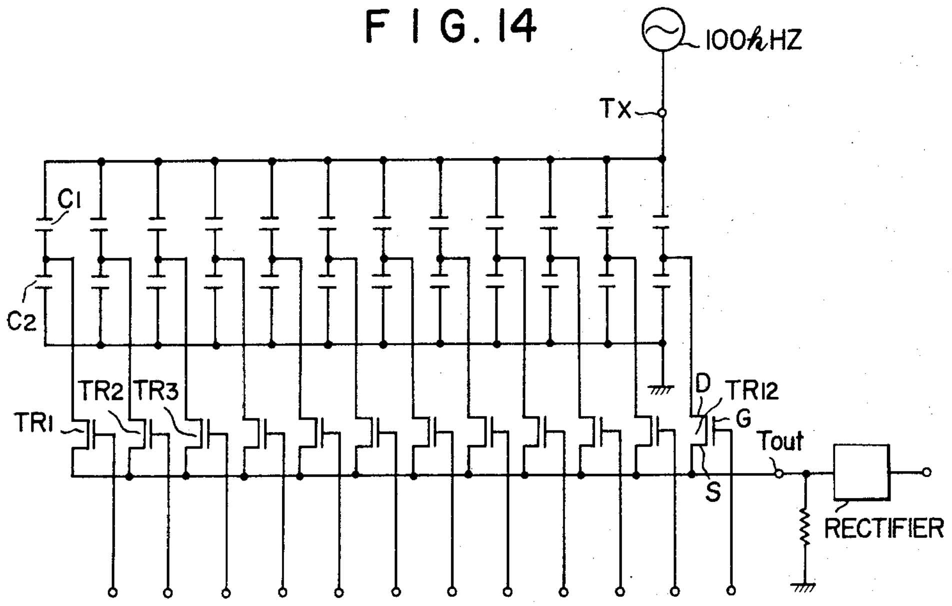
FIG. 14 is an equivalent circuit diagram of the device shown in FIG. 13.

Accordingly, if the transistors $TR_1$ through $TR_{12}$ are made conductive one by one successively by the read-out signals in the described order, an output voltage waveform corresponding to the pattern shown in FIG. 13 is obtained. FIG. 14 is an equivalent circuit diagram of the device shown in FIG. 13. In FIGS. 13 and 14, like parts are shown with like symbols.

Figure 15:
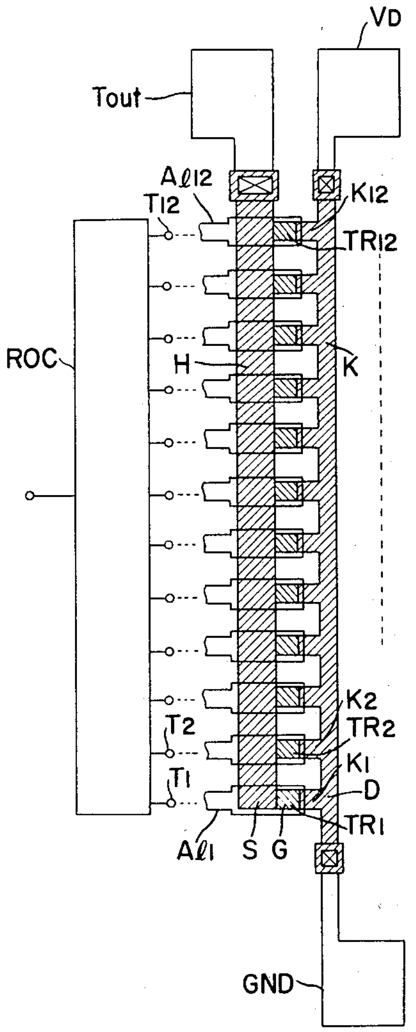
FIG. 15 is one embodiment of the digital-analog converter according to the present invention.

A digital-analog converter according to the present invention is shown in FIG. 15 in which a read-out control circuit ROC is illustrated by a block.

For convenience in describing the digital-analog converter, an MOS type semiconductor integrated circuit is employed and a transistor of P channel type is used as a switching transistor.

Furthermore, a P type diffusion resistance layer is illustrated with ▨ and the gate electrode of an MOS transistor is illustrated with ▧ . Furthermore, A vacuum-evaporated metal portion is shown with □ and a portion connecting the vacuum-evaporated metal portion and the P type diffusion layer is shown with ⊠ .

In FIG. 15, one end of a P type diffusion resistance layer K is connected to an electrical source $V_D$ while the other end thereof is grounded. The diffusion resistance layer K has a plurality of connecting portions $K_1$ through $K_{12}$ the ends of which form the drains of MOS (P channel) transistor $TR_1$ through $TR_{12}$ respectively. The sources of the transistors $TR_1$ through $TR_{12}$ are connected through a P type diffusion layer H to an output terminal T-out. The gate electrodes G of the transistors $TR_1$ through $TR_{12}$ are connected through vacuum-evaporated aluminum layers $Al_1$ through $Al_{12}$ to the output terminals $T_1$ through $T_{12}$ of a read-out control circuit ROC.

The read-out control circuit ROC receives a digital code input signal and produces a read-out output at only one output terminal that corresponds to the code. The read-out output is a pulse the value of which is sufficient to make the transistor conductive. Since the read-out control circuit ROC can be readily composed of well-known circuits, detailed description of the read-out control circuit will be omitted.

The connecting portions $K_1$ through $K_{12}$ of the diffusion resistance layer K are equally spaced, and therefore the resistances R between the connecting portions are the same.

Figure 16:
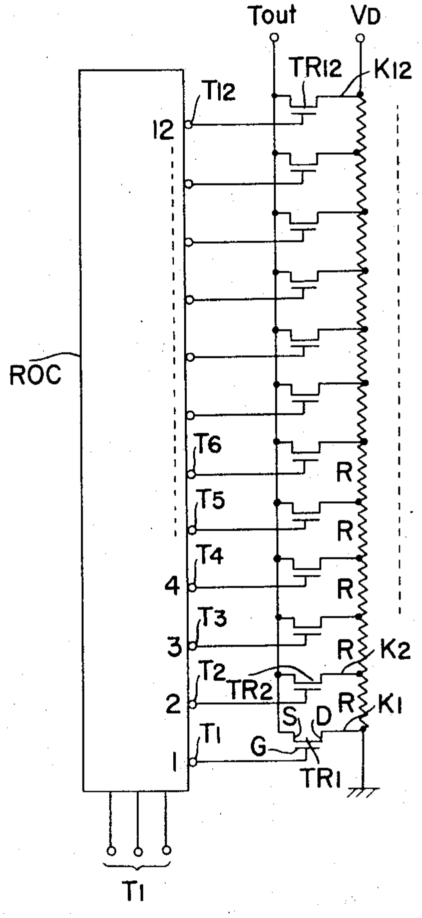
FIG. 16 is also an equivalent circuit diagram of the device shown in FIG. 15.

An equivalent circuit of the digital-analog converter of FIG. 15 is shown in FIG. 16.

Therefore, the operation of the digital-analog converter will be described with reference to FIG. 16.

When a digital signal having a code which is to produce a read-out output at the terminals $T_1$ is applied to the read-out control circuit ROC through terminals T, the read-out output of a negative pulse is developed at the terminal $T_1$ only. The output thus developed is in turn applied to the gate G of the transistor $TR_1$. As a result, the transistor $TR_1$ becomes conductive and the potential (to the ground) of the connecting portion $K_1$ is therefore introduced to the output terminal T-out. In the same way, when a read-out output is produced at the terminal $T_2$, a voltage corresponding to the resistance between the connecting portion $K_2$ and the ground is introduced to the output terminal T-out. When a read-out output is produced at the terminal $T_6$, a voltage corresponding to resistance 5R is obtained.

As is apparent from the above description, readout outputs are produced at the respective terminals of the read-out control circuit ROC, voltages exactly corresponding to the read-out outputs are introduced to the output terminal T-out. Thus, analog signal voltages corresponding to the output digital signals of the readout control circuit ROC are obtained.

In the embodiment described above, the number of the output terminals of the read-out control circuit ROC is twelve and the number of the connecting portions of the diffusion resistance layer is also 12, but the number of them can, of course, be increased or decreased as desired.

Furthermore, the diffusion resistance layer may be not only of P type but also of N type, and the transistor may be not only an MOS transistor, but also a junction type field-effect transistor and a bipolar transistor.

Incidentally, such a semiconductor integrated storage element as shown in FIG. 1 is manufactured through a process of diffusing a P type diffusion layer in a substrate, an oxide covering process, a "gate-cut" process, a "contact-cut" process, a metal vacuum-evaporation process and a glass ("glass-cut") process in this order. Therefore, as is shown in FIG. 1, when "contact-cuts" $CP_1$ through $CP_n$ are provided on insulating layers which are laid on P type diffusion layers $P_1$ through $P_n$, in correspondence to analog sampling values which are to be stored, the analog sampling values to be stored by the element described above are determined fixedly in the "contact-cut" process. Therefore, contents to be stored cannot be changed in the following processes. This means that, during the manufacture of many and various storage elements, it becomes necessary to change the contents of the contact-cut process and the subsequent processes for every storage element, and furthermore a glass mask suitable, for storage contents must be provided in the "contact-cut" process.

Figures 17, 18:
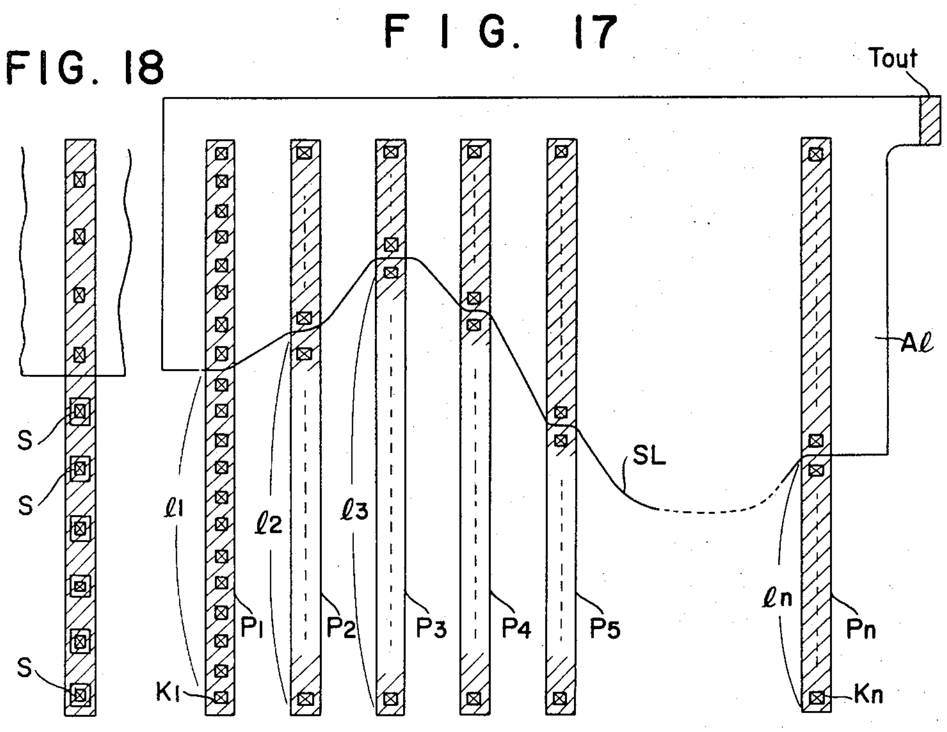
FIG. 17 is a plan view showing the essential part of elements employed in the semiconductor storage device which is a further embodiment according to the present invention.
FIGS. 18 and 19 are plan views shwoing a part of the elements shown in FIG. 17.

In order to eliminate such drawbacks as described above, according to the present invention the process of manufacturing the storage elements is made to be the same up to the "contact-cut" process for all the storage elements, but a treatment for making it possible for the element to store necessary analog information is conducted in the metal vacuum-evaporation process. That is, as is shown in FIG. 17, small contact-cut portions (through-holes) $K_1$ through $K_n$ are provided at a certain interval on the insulating layer laid on each of the P type diffusion layers $P_1$ through $P_n$. It is obvious that, because the contact-cut portions are thus provided, only one kind of glass mask can be used in each of the process up to the contact-cut process regardless of the contents to be stored. In the metal vacuum-evaporation process, an aluminum layer $Al$ is formed by vacuum-evaporation so that the side line SL pattern of the aluminum layer corresponds to the contents to be stored. Therefore, in each of the P type diffusion layers $P_1$ through $P_n$, a distance ($l_1$, $l_2$ through $l_n$) between a "contact-cut" portion, which is the closest to the side line SL and connected to the aluminum layer, and an end of the diffusion layer which end is connected to a transistor ($TR_1$ through $TR_n$) becomes an effective length into which a sampling value will be stored as a resistance value. Thus, analog values corresponding to the distances from the side line SL of the vacuum-evaporated aluminum layer $Al$ can be stored in the storage element.

One modification of the storage element shown in FIG. 17 is illustrated in FIG. 18. In FIG. 18, only a part of the diffusion resistance layer is shown, but the vacuum-evaporated aluminum layer $Al$ is the same as shown in FIG. 17. However, FIG. 18 is different from FIG. 17 in that further vacuum-evaporated aluminum layers small in area are laid over the "contact-cut" portions which are not covered by the aluminum layer $Al$. Owing to this the "contact-cut" portions not used can be protected from moisture and the like.

Figure 19:
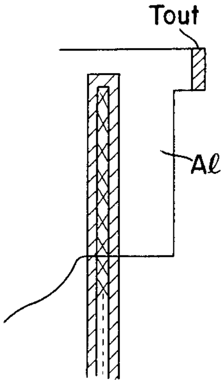

In each resistance layer, the contact-cut portions may be formed to be one continuous slit shape in a longitudinal direction as shown in FIG. 19, though the "contact-cut" portion are discontinuously arranged at a certain interval in the previous examples.

As is clear from the previous description disclosed with reference to FIG. 3, if the "contact-cut" portions are provided on the insulating layer at the specific intersections, which are correspondent to analog quantities to be stored, of the intersections of the diffusion layers $H_1$, $H_2$ through $H_{12}$ and the aluminum layers $A_1$ through $A_{12}$ thereby to connect the diffusion layer to the aluminum layer, output voltages of predetermined magnitude can be obtained in response to read-out signals.

In this connection, the semiconductor storage elements as described above are manufactured through a process of diffusing a P type diffusion layer in a substrate, an oxide covering process, a "gate-cut" process, a "contact-cut" process, a metal vacuum-evaporation process and a glass ("glass-cut") process in this order. Therefore, when the "contact-cut" portions $C_1$, $C_2$, $C_3$ through $C_{12}$ are provided on the insulating layer at the predetermined specific intersections corresponding to analog sampling values to be stored, analog values to be stored in the storage element are determined in the contact-out process, and therefore contents to be stored cannot be changed in the succeeding processes. This means that, in the case of manufacturing many and various storage elements, it becomes necessary to change the contents of the "contact-cut" process and the subsequent processes for every storage element, and furthermore a glass mask suitable for storage contents must be provided in the "contact-cut" process.

In order to overcome these drawbacks, according to the present invention the process of manufacturing the storage elements is the same up to the "contact-cut" process for all the storage elements, but a treatment for making it possible for the elements to store necessary analog information is conducted in the metal vacuum-evaporation process.

Figures 20, 21:
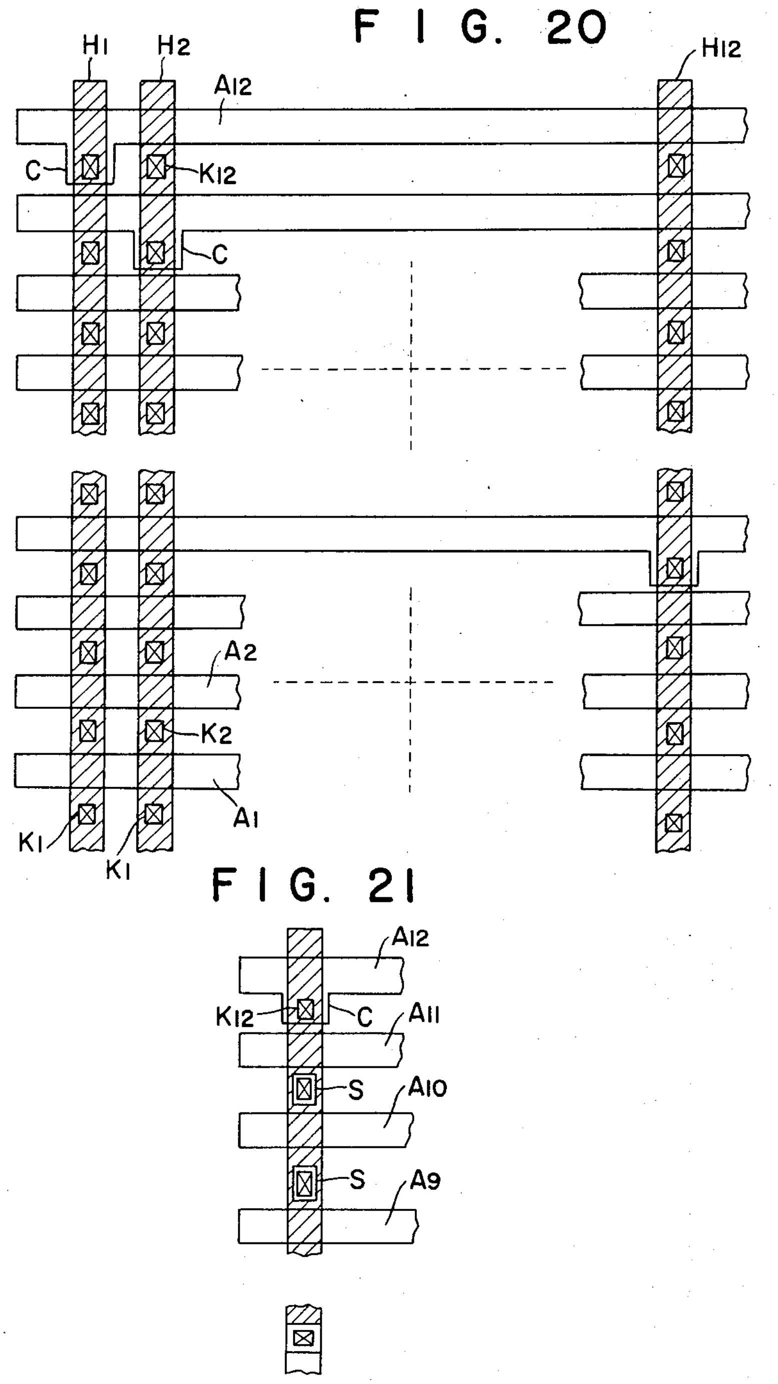
FIG. 20 is also a plan view showing the essencial part of elements employed in the semiconductor storage device which is a specific embodiment according to the present invention.
FIG. 21 shows a part of the elements illustrated in FIG. 20.

That is, as is shown in FIG. 20, small "contact-cut" portions $K_1$ through $K_{12}$ are provided on an insulating layer laid on each of the P type diffusion layers $H_1$ through $H_{12}$ in a longitudinal direction. The "contact-cut" portions provided on each diffusion layer are aligned traversing the diffusion layers. Therefore, the arrangement of the cut portions is the same for all the storage element until completion of the contact-cut process. Accordingly, only one kind of glass mask can be used in this method regardless of contents to be stored.

In the metal vacuum evaporation process, aluminum layers $A_1$ through $A_{12}$ are vacuum-evaporated in the form of belts. Each of the aluminum layers comprises a main portion and a branched portion, the main portion being interposed between the traversing lines of the "contact-cut" portions, the branched portion being placed on one predetermined specific contact-cut portion of the diffusion layer. As a result, one diffusion layer and one aluminum layer are connected together with the aid of the specific contact-cut portion on which the branched portion is arranged, and if a readout signal is applied to one end of the diffusion layer as is described before, a voltage developed at the connecting portion of the diffusion resistance layer K (in FIG. 3) corresponding to the position of the specific "contact-cut" portion is read out.

FIG. 21 shows a part of one modification of the storage element of FIG. 20. The arrangement of the aluminum layers $A_1$ through $A_{12}$ in FIG. 21 is the same as that in FIG. 20, but a vacuum-evaporated aluminum layer S is provided on the "contact-cut" portion which is not covered with the branched portion C. Because of this provision of the aluminum layer, the contact-cut portions which are not used are protected from moisture and the like.

The semiconductor storage element of the construction shown in FIG. 3 utilize only the resistances of the common diffusion resistance layer K in a longitudinal direction. For this purpose, the connecting portions of the layer are equally spaced. Therefore, the variation of the voltages developed at these connecting portions as linear. Accordingly it is impossible for the storage element to obtain such a characteristic as the variation of the voltage is logarithmic.

In order to eliminate the disadvantage described above, according to one respect of the present invention the voltage variation characteristic is made to be logarithmic which is obtained at the diffusion resistance layer with the area of the diffusion resistance layer being effectively utilized.

Figure 22:
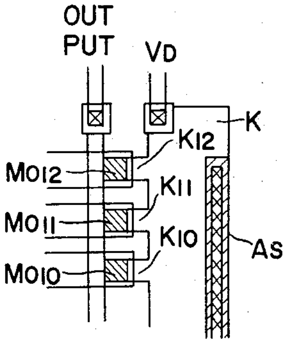
FIG. 22 is a plan view showing a part of the elements employed in the semiconductor storage device which is more specific embodiment according to the present invention.
Figure 23:
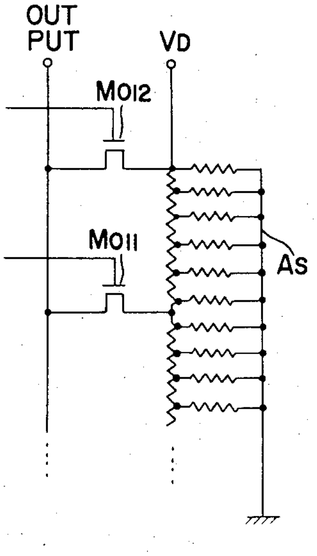
FIG. 23 is an equivalent circuit diagram of the elements shown in FIG. 22.

That is, as is shown in FIG. 22, one end of a P type diffusion resistance layer K is connected to an electrical source, and a "contact cut" portion formed into one integral unit is provided longitudinally on one side of the diffusion resistance layer, the one side being opposite to the side thereof where connecting portions $K_1$, $K_2$, $K_3$ and so forth are positioned. Furthermore, an electrically conductive layer As is provided on and connected to the "contact-cut" portion, and the conductive layer As is grounded whereby the resistance of the resistance layer K is utilized in such a way as distributed-constant. Consequently, as is apparent from FIG. 23 which shows an equivalent circuit of the element illustrated in FIG. 22, the circuit shown is a distributed-constant ladder type attenuation circuit, and it is therefore clear that a voltage variation characteristic found in the P type diffusion resistance layer is logarithmic. If it is assumed that a longitudinal resistance and a lateral resistance per unit length of the resistance layer are $r$ and R, respectively, the degree of attenuation is determined by a factor $r/R$. Therefore, voltages changing logarithmically can be obtained at the connecting portions $K_1$, $K_2$, $K_3$ and so forth. Furthermore, since the shape of the diffusion resistance layer is simple with a certain width, the positions of the connecting portions can be correctly set up and the diffusion process is also simple. In this connection, if the "contact-cut" portion is broken into several parts so that a plurality of the "contact-cut" portions are provided, the voltage variation characteristic will be changed more optionally.

We claim:

1. A semiconductor storage device comprising: a semiconductor substrate; a plurality of separate storage regions formed in the semiconductor substrate the dimensions of each of which being dependent upon the analog value to be stored therein whereby analog sampling values are stored in said storage device.

2. A semiconductor storage device which comprises: a storage section which is adapted to store analog sampling values substantially in the form of resistance values said storage section being formed in a semiconductor substrate and having a plurality of separate storage regions the dimensions of each of which being dependent upon the analog value to be stored therein; and a read-out control circuit operatively associated with said storage section for introducing readout signals thereto in response to read-out control instructions from said read-out control circuit, whereby analog information is obtained from the read-out signals.

3. A semiconductor storage device adapted to store analog sampling values comprising: a plurality of belt-like diffusion resistance layers formed on a semiconductor substrate said layers being of the same width but of different effective lengths, which lengths are proportional to the resistance of the layers so that the analog sampling values can be stored therein and represented by the respective resistance values of the layers; an insulating layer laid on said diffusion resistance layers and having "contact-cut" areas for providing contact therethrough to said layers and disposed at predetermined intervals lengthwise of each diffusion resistance layer; and an electrically conductive layer having a side line which has a predetermined shape and traverses all the diffusion resistance layes so as to cover at least one of said contact-cut portions, whereby in the region which is not covered with the electrically conductive layer the effective lengths of said diffusion resistance layers are the distances between the point which the trace of said side line makes on the diffusion resistance layers and the ends of the diffusion resistance layer.

4. A semiconductor storage device comprising: a diffusion resistance layer having a plurality of connecting portions and having a voltage applied across two ends of the layer; a plurality of transistors each of which has a gate electrode and a source and drain junction, each of said sources being connected to respective ones of said connecting portions; a plurality of diffusion layers to one end of each of said read-out signals are applied; and a plurality of electrically conductive belt-like layers which cross the diffusion layers to form a grid-like array each being connected at one thereof to the gate of a respective one of said transistors; an insulating layer interposed between the diffusion layers and the electrically conductive layer, said diffusion layers and said electrically conductive layers being selectively connected together through a plurality of "contact-cut" portions each corresponding to an analog sampling value to be stored, provided in said insulating layer on each of the diffusion layers at predetermined intervals lengthwise thereof, the read-out signals being applied to respective gates of the transistors through respective selected diffusion and electrically conductive layers which selected layers are connected together by said "contact-cut" portions, whereby said transistors become conductive and voltages appearing at each one of said connecting portions are read out through the sources of respective ones of said transistors.

5. A semiconductor storage device comprising: a common diffusion resistance layer having a plurality of connecting portions; a plurality of transistors each having a source, drain and gate electrode with each of said sources being connected to respective ones of said connecting portions; a plurality of belt-like diffusion layers to one end of each of which read-out signals are applied; and a plurality of electrically conductive belt-like layers which cross the diffusion layers to form a grid-like array each being connected at one end thereof to the gate of a respective one of said transistors; an insulating layer interposed between said diffusion layers and said electrically conductive layers and having "contact-cut" portions for selectively connecting together said diffusion and electrically conductive layers, the read-out signals being applied to respective gates of said transistors through respective selected diffusion and electrically conductive layers which selected layers are connected together through said "contact-cut" portions whereby said transistors become conductive and voltages appearing at the connecting portions are read out through respective sources of said transistors; and in which said common diffusion resistance layer is formed as a belt, having said plurality of connecting portions and a voltage of a predetermined value is applied between one end of said belt-like diffusion resistance layer and an elongated portion which is positioned on the side opposite to that side having said connecting portions and in direction lengthwise of said diffusion resistance layer.

* * * * *

UNITED STATES PATENT OFFICE

CERTIFICATE OF CORRECTION

Patent No. 3812478 Dated May 21, 1974

Inventor(s) Norio Tomisawa; Takehisa Amano; Yasuji Uchiyama; Takatoshi Okumura, all of Hamamatsu, Japan.

It is certified that error appears in the above-identified patent and that said Letters Patent are hereby corrected as shown below:

[30] Foreign Application Priority Data

July 31, 1971 Japan 46- 57828 --.

Signed and sealed this 24th day of September 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334.